United States Patent
Sigmund et al.

(10) Patent No.: US 8,902,409 B2
(45) Date of Patent: Dec. 2, 2014

(54) OPTOELECTRIC SENSOR AND A METHOD FOR THE DETECTION AND DISTANCE DETERMINATION OF OBJECTS

(75) Inventors: Jorg Sigmund, Freilburg (DE); Stefan Mack, Freiburg (DE); Michael Kerp, Waldkirch (DE)

(73) Assignee: Sick AG, Waldkirch (DE)

(*) Notice: Subject to any disclaimer, the term of this patent is extended or adjusted under 35 U.S.C. 154(b) by 209 days.

(21) Appl. No.: 13/533,488

(22) Filed: Jun. 26, 2012

(65) Prior Publication Data

US 2013/0003041 A1    Jan. 3, 2013

(30) Foreign Application Priority Data

Jun. 28, 2011 (EP) ..................... 11171772

(51) Int. Cl.
    *G01S 7/487*  (2006.01)
    *G01S 17/93*  (2006.01)
    *G01S 7/497*  (2006.01)
    *G01S 17/95*  (2006.01)

(52) U.S. Cl.
    CPC ............... *G01S 7/487* (2013.01); *G01S 17/936* (2013.01); *G01S 7/497* (2013.01); *G01S 17/95* (2013.01)
    USPC .......... 356/5.01; 356/3.01; 356/4.01; 356/5.1

(58) Field of Classification Search
    CPC ....... G01S 7/487; G01S 17/936; G01S 17/95; G01S 7/497; G01C 3/08; G01B 11/25; G01B 11/24
    USPC ............. 356/3.01–3.15, 4.01–4.1, 5.01–5.15, 356/6–22
    See application file for complete search history.

(56) References Cited

U.S. PATENT DOCUMENTS

2001/0043335 A1* 11/2001 Norita et al. .................. 356/601

FOREIGN PATENT DOCUMENTS

| DE | 4340756 A1 | 6/1994 |
|---|---|---|
| DE | 102009057104 A1 | 6/2011 |
| EP | 1085346 * | 3/2001 |
| EP | 1085346 A1 | 3/2001 |
| EP | 1124142 A1 | 8/2001 |
| EP | 1450128 A1 | 8/2004 |
| EP | 2182377 A1 | 5/2010 |
| EP | 2182378 A1 | 5/2010 |

OTHER PUBLICATIONS

European Search dated Sep. 14, 2011, of corresponding priority application No. EP11171772.4.

* cited by examiner

*Primary Examiner* — Luke Ratcliffe
(74) *Attorney, Agent, or Firm* — Nath, Goldberg & Meyer; Jerald L. Meyer; Katelyn J. Bernier (57) ABSTRACT

An optoelectronic sensor (10) for the detection and distance determination of objects in a monitored area (18) transmits a transmission light beam (14), generates a reception signal from remitted transmission light (20), and determines an object distance from a light time of flight. A reception path between light receiver (24) and evaluation unit (30) is divided into a first and a second partial reception path (46, 48, 50, 52) at a splitter element (44) comprising filtering properties to pass higher frequency parts of the reception signal on to the first partial reception path (46, 48) and lower frequency parts on to the second partial reception path (50, 52). An object's distance is determined from the first and an opacity from the second partial reception signal.

23 Claims, 4 Drawing Sheets

OPTOELECTRIC SENSOR AND A METHOD FOR THE DETECTION AND DISTANCE DETERMINATION OF OBJECTS

Optoelectronic sensors are used in a number of applications for the detection of objects. In the simpler cases, these are distance sensors which can only detect objects and determine distances in one detection direction.

Considerably more spatial information is provided by a laser scanner. A light beam generated by a laser periodically moves over a monitored area by means of a deflection unit. The light is remitted by objects in the monitored area and evaluated in the scanner. From the angular position of the deflection unit, the angular position of the object is determined, and additionally from the light time of flight the distance of the object from the laser scanner is measured using the vacuum speed of light. In principle, two methods are known to measure a light time of flight. In phase-based methods, the transmission light is modulated, and the phase shift of the received light with respect to the transmitted light is evaluated. In pulse-based methods, the laser scanner measures the time of flight until a transmitted light pulse is again received.

By the angular and distance values, the position of the object within the monitored area is detected in two-dimensional polar coordinates. The third spatial coordinate can also be detected by a relative motion in a transverse direction, for example by an additional movement degree of freedom of the deflection unit in the laser scanner, or by moving the object relative to the laser scanner. Thus, also three-dimensional contours can me measured.

In addition to these measurement applications, laser scanners are also used in safety technology for monitoring a source of danger like a dangerous machine. Such a safety laser scanner is known from DE 43 40 756 A1. Therein, a protection field is monitored that must not be entered by personnel during operation of the machine. Other intrusions into the protected field, for example by static parts of the machine, can be taught in advance as being allowed. Often, warning fields are arranged in front of the protection fields, where intrusions at first merely trigger a warning in order to prevent the intrusion into the protection field and a successive shutdown in time, thus increasing availability of the system. Safety laser scanners for the most part use a pulse-based time of flight method.

Sensors used in safety technology have to operate particularly reliable and, therefore, have to meet high safety requirements, for example the standard EN13849 for machine safety and the device standard EN61496 for contactless protection devices. To meet these safety standards, a number of measures have to be taken, as for example a safe electronic evaluation by redundant, diversified electronics, operation monitoring, in particular monitoring for contamination of optical elements like a front screen, and/or provision of individual test targets having defined degrees of remission which have to be detected at respective scan angles.

In case that laser scanners are to be used outdoors, one has to expect opacity of the air by fog, dust or the like. The decreased visual range reduces the energetic range of the laser scanner due to stray loss. Depending on the kind of evaluation, it is even possible that an undesired shutdown occurs due to glare from the signal caused by the opacity. The actual target object is no longer detected, or a fog signal is falsely interpreted to be an object.

Conventionally, different evaluation methods are used to obtain information about the objects in the detection area and the object's distance from the reception signal. In a threshold method, exceeding a signal threshold is interpreted as an object signal. The height of the threshold is set considering the smallest signal to be detected, i.e. for example an object of minimal remittance at the limit of the range. This kind of threshold evaluation may easily cause an undesired shutdown because a signal generated by fog or similar air opacities rapidly exceeds the set threshold in particular in a near range due to the quadratic intensity decrease of the reception signal with the distance. On the other hand, increasing the threshold is not possible, because a far, weakly remitting object could no longer be detected. A simple, threshold-based sensor is not able to operate in an environment with air opacities, because it shuts down too early and is therefore not available.

A conventional approach of redress is to decrease the threshold with increasing distance. At least in safety technology, it is not always possible to define a suitable distance-dependent threshold which is able to discriminate between a fog signal and an object to be detected in all situations.

Some threshold-based laser scanners detect more than one intensity maximum. Such sensors are at least not completely blind for targets that are positioned within of behind air opacity. Since air opacity does not only generate one intensity maximum, as to be explained in detail below, even multiple detections do not suffice to reliably detect objects outdoors.

Another class of laser scanners does not evaluate the reception signal based on a threshold, but considers the entire echo signal following a transmission pulse. The reception signal is detected with an ND converter, and the entire signal course is stored and subsequently evaluated by a pattern detection method. This approach is for example used in EP 2 182 378 A1. A disadvantage is that an ND converter needs a very high sampling rate to detect pulse positions in a nanosecond range and below. The evaluation electronics needs to be correspondingly powerful. This does not only increase manufacturing costs, but also power consumption of the laser scanner.

Another problem is to record the signal course with as few distortions as possible, because otherwise the object distances cannot be derived therefrom with high precision. Due to the large dynamics requirements over several orders of magnitude, this can also only be achieved with expensive components. In the EP 2 182 377 A1, the problem of dynamic ranges is solved by dividing the reception path into a more sensitive and a less sensitive reception path. Thus, even two high-end ND converters are needed, or it is necessary to find possibilities to doubly use the existing ND converter. A reliable way of discriminating intensity peaks corresponding to an object to be detected and intensity peaks emerging from opacity is not looked for in EP 2 182 377 A1 and, consequently, not discussed.

It is therefore an object of the invention to enable outdoor use of a distance measuring optoelectronic sensor.

This object is satisfied by an optoelectronic sensor for the detection and distance determination of objects in a monitored area, the sensor having a light transmitter for transmitting a transmission light beam, a light receiver for generating a reception signal from remitted transmission light remitted or reflected from objects in the monitored area, and an evaluation unit configured to determine an object distance from the light time of flight between transmission of the transmission beam and reception of remitted transmission light, wherein a reception path between light receiver and evaluation unit is divided into a first partial reception path and a second partial reception path at a splitter element, the splitter element comprises filtering properties to pass higher frequency parts of the reception signal as a first partial reception signal on to the first partial reception path and lower frequency parts of the reception signal as a second partial reception signal on to the second partial reception path, and i the evaluation unit is configured to determine a presence of objects in the monitored area and the object's distance from the first partial reception signal and an opacity from the second partial reception signal.

Moreover, the object is also satisfied by a method for the detection and distance determination of objects in a monitored area, wherein a transmission light beam is transmitted and remitted or reflected parts of the transmission light beam are detected and converted into a reception signal, and wherein an object distance is determined from the light time of flight between transmission of the transmission light beam and reception of remitted transmission light, wherein the reception signal is divided into a first partial reception signal on a first partial reception path and a second partial reception signal on a second partial reception path at a splitter element based on frequency properties, wherein the presence of objects in the monitored area and the object's distance is determined from the first partial reception signal and an opacity is determined from the second partial reception signal.

The invention starts from the basic idea that opacities also generate remission and a distance dependent reception signal. Therefore, the overall reception signal is considered to be a superposition of a first partial reception signal which is generated by the actual solid objects to be detected in the monitored area, and a second partial reception signal due to opacity, i.e. impairment of sight or of air transmissivity caused by fog, dust or the like. These two signal parts are separated and evaluated individually. This enables to not simply eliminate the second partial reception signal as interference, but to use it as a source of valuable additional information. For the separation, a splitter or a frequency diplexer, respectively, is used, which can separate the superposition because the opacity causes comparably slow signal changes.

The invention has the advantage that also objects in environments with opacity can reliably be detected. This also enables to extract echoes of a hard target, i.e. of a solid object to be detected, from the superposed signal due to soft targets causing the opacity. In the first partial reception signal, signal parts of these soft targets are reduced or eliminated. In addition, opacity can be detected and evaluated from the second partial reception signal. This can be used to evaluate the reliability of the detected object distances. In addition, a classification of the interference by soft targets is supported, for example to adapt or at least record the application conditions. The additional hardware costs for the splitter element and some evaluation are very low.

The transmission light beam preferably comprises a plurality of successive individual light pulses, and the evaluation unit is preferably configured to accumulate a plurality of reception pulses of the first partial reception signal in a time histogram and to determine the object distance from the histogram. Here and below, the term preferably refers to an advantageous, but completely optional feature. A pulse averaging method as described is considerably more robust than a single pulse method. As already explained, it is important to record the reception signal free of distortions. Otherwise, the reception pulse and its temporal position are not detected with sufficient precision. One advantage of a pulse averaging method is the larger dynamics tolerance, because a part of the dynamics is compensated by the averaging and does not have to be handled by the receptions electronics alone.

The transmission light beam preferably comprises a plurality of successive individual light pulses, and the evaluation unit is preferably configured to accumulate a plurality of sections of the second partial reception signal following a transmitted individual light pulse in a time histogram and to determine a measure for the opacity from the histogram. Consequently, the second partial reception signal is evaluated by a pulse averaging method. At its recording, a distortion-free amplification is important, because only then pre-knowledge about the expected pulse shape, i.e. the signal dynamics of the sensor, enable a unique identification of a signal generated by opacity. With a pulse averaging method, a considerably larger range of opacities is safely detected, because an overdriven second partial reception signal occurs only at significantly larger opacities than in the case of a single pulse method.

The sensor preferably is a laser scanner in that the sensor comprises a movable deflection unit for periodically deflecting the transmission light beam in the monitored area and an angle encoder for generating angle position signals in dependence on an angular position of the deflection unit. In a laser scanner, object positions are not only detected along one line of sight, but in an entire scanning plane by means of a movable, in particular rotatable deflection unit. The evaluation is preferably configured to select a respective group of reception pulses to be gathered in a histogram based on the angular position signal and to assign the object distance determined from the histogram of the group to a detection angle given by the angle position signal. In case that a pulse averaging method is used for determining distances, a plurality of events, namely, the receptions signals following a transmitted individual pulse, are accumulated in a histogram over a certain angular range. Then, there is a trade-off between range, rotation speed of the deflection unit (scanning frequency), repetition frequency of the transmission pulses, and angular resolution. For example, by a longer averaging time, i.e. accumulating a larger number of events, a larger range can be achieved because the larger statistical depth further increases the signal-to-noise-ratio. The larger averaging time in turn can be obtained by a slower rotation of the deflection unit or by accumulating events over a larger angular range. In a similar manner, these parameters in trade off relation can be optimized and adapted.

The evaluation unit is preferably configured to form groups of high angular resolution for the first partial reception path and/or groups of a lesser angular resolution for the second partial reception path. The high angular resolution is preferably at most 2° and the lesser angular resolution is preferably at least 3°. Here, the terms high angular resolution and lower angular resolution are to be mainly understood in relation to one another. In absolute terms, the angular resolution of the actual object detection from the first partial reception signal can be at most 5°, 2.5°, 1° or even only 0.5° or less. In contrast, the angular resolution for the detection of opacity based on the second partial reception signal is for example at least 3°, 5°, 10°, 20° or even more. The different angular resolutions are based on the assumption that opacity, in contrast to the smallest objects to be detected, does not occur only locally in a narrow angular range. By accumulating a larger number of events, the signal-to-noise-ratio for the second partial reception path can therefore be improved, and the opacity be determined with more accuracy. As an alternative to different angular resolutions, the same angular resolution can be used for the opacity measurement and the actual distance measurement.

An analog preprocessor is preferably provided in the first partial reception path comprising a filter element to convert a respective reception pulse into a bipolar pre processed signal and pass it on to the evaluation unit via an ND converter. The digitizing therefore takes place only after separation into the first partial reception signal and the second partial reception signal. Determination of the temporal position of the reception pulse in the bipolar signal is possible with considerably more accuracy than in the original signal. The analog preprocessor preferably comprises a limiting amplifier for amplifying the positive and negative parts of the signal to a saturation value, wherein the A/D converter is a binarizer. In this embodiment, each event gives only a contribution of one bit to the histogram for the pulse averaging method. This enables a simple evaluation which has only little evaluation hardware requirements and can be performed very fast.

The splitter element is preferably also the filter element. In the embodiment described in the previous paragraph, a filter element is already provided which is for example configured as a band pass to generate a bipolar signal. These filter properties can at the same time be used to implement the separation into the first partial reception signal and the second partial reception signal. With this dual function, one component can be dispensed with.

Preferably, a first A/D converter is provided in the first partial reception path and a second A/D converter is provided in the second partial reception path. In this case, both partial reception signals are digitized in parallel after their separation and are subsequently evaluated in two digital evaluation channels. Preferably, a sampling frequency of the second A/D converter is lower than a sampling frequency of the first A/D converter. Therefore, a simpler component can be used as the A/D converter in the second partial reception path. A somewhat lower temporal resolution is sufficient for the second partial reception signal because for that part of the evaluation there is no need for a highly precise determination of reception points in time to determine object distances. Both A/D converters can be implemented on the same component, in particular on the same FPGA (Field Programmable Gate Array).

The evaluation unit is preferably configured to integrate the second partial reception signal to determine the measure for the opacity from the level information obtained by the integration, in particular to obtain the level information as a sum over the histogram. The integral of the second partial reception signal corresponds to the total energy which is received due to diffuse remission at soft targets. It therefore is a measure for opacity. This measure can be output to display the current application conditions. Thereafter, the range, in particular the safe range for applications in safety technology, can be adapted accordingly. Measures can be taken, for example by decreasing the speed of an automated guided vehicle protected by the sensor. In measuring or classifying opacity, a safety technological application is enabled outdoors, because the sensor detects whether the conditions are sufficient for a safe object detection, and can trigger any necessary safety measures.

Reception optics arranged in front of the light receiver are preferably made such that the reception signal comprises intensity characteristics in dependence on the objects distance which are periodically modulated with a period that is large as compared to the duration of a transmission pulse and corresponds to at most half the range of the sensor. The intensity characteristics in dependence on the objects distance, also called the signal dynamics, is not flat due to properties of the reception optics and the quadratic decrease of energy with distance. The same object therefore generates a different reception pulse depending on its object distance. These intrinsic signal dynamics can be superposed with an artificial modulation by optics design, and the modulation is virtually used as a signature to identify a reception signal caused by opacity. The spatial frequency of the modulation should be outside the frequency portions of the transmission pulses so that the modulation does not impair the determination of the temporal position of the actual reception pulses of objects to be detected. This can for example be achieved by a period of several meters, in particular of about 2 meters. The reception pulses are so short in comparison that they are hardly affected. Then, the pulses are only increased or decreased as a whole by a factor near one due to the modulation of the signal dynamics. On the other hand, the modulation period should not be too large, for example should be smaller than half the range of the sensor, so that the modulation can actually be detected within the sensor range.

The evaluation unit is preferably configured to detect opacity based on a modulation of the second partial reception signal. The evaluation unit, for example, evaluates the second partial reception signal by correlation with the known signal dynamics. With that, the opacity is reliably detected, measured, and discriminated from other interference. It is not even necessary to digitize the second partial reception signal in this case. The amplitude if the known modulation of the signal dynamics can also be detected from the analog signals.

The sensor is preferably a safety laser scanner comprising a safe output, and the evaluation unit of the safe laser scanner is preferably configured to output a shutdown signal via the safe output upon detection of a forbidden intrusion into a predefined protection area within the monitored area. Due to the improved handling of opacity, safety technological applications are also enabled outdoors and in dusty or otherwise contaminated environments, respectively.

The inventive method can be modified in a similar manner and shows similar advantages. Such advantageous features are described in the sub claims following the independent claims in an exemplary, but non-limiting manner.

Figure 1:
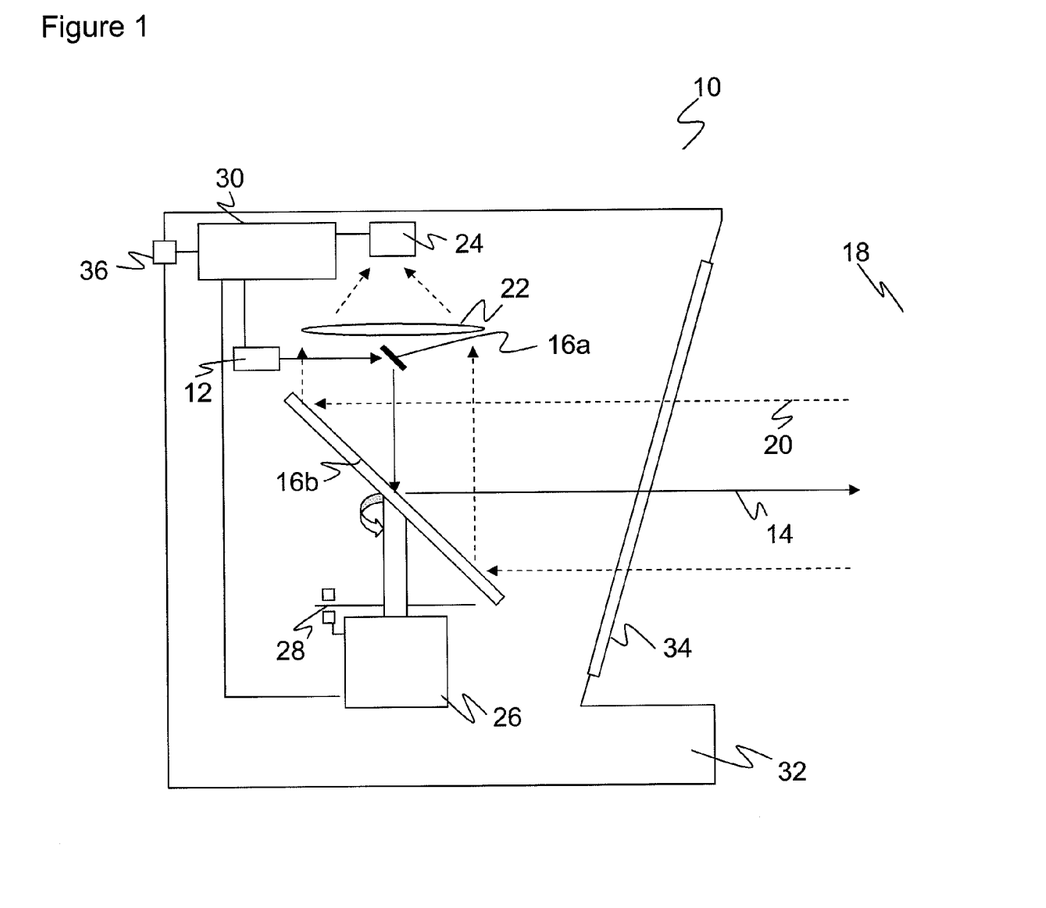
FIG. 1 a schematic sectional view of an embodiment of a safety laser scanner.

The invention is described in the following also in view of additional features and advantages based on embodiments and with reference to the enclosed drawing. The Figures of the drawing show in:

FIG. 1 shows a schematic sectional view through a laser scanner 10. The invention is described based on this example, but also encompasses other optoelectronic sensors for the detection and distance determination of objects, in particular one-dimensional optical distance sensors.

A light beam 14 generated by a light transmitter 12, for example a laser, and comprising individual light pulses is guided into a monitored area 18 by light deflection units 16*a*-*b* and, if an object is present in the monitored area 18, is remitted from the object. The remitted light returns to the safety laser scanner 10 and is detected via the deflection unit 16b and through reception optics 22 in a light receiver 24, for example a photo diode.

The light deflection unit 16b is generally made as a rotating mirror in continuous rotation driven by a motor 26. The respective angular position of the deflection unit 16b is detected by an encoder 28. The light beam 14 generated by the light transmitter 12 therefore scans the monitored area 18 generated by the rotational movement. In case that a reflected light signal 20 is received by the light receiver 24, the angular position of the object in the monitored area 18 can be derived from the angular position of the deflection unit 16b.

Additionally, the time of flight of the individual laser light pulses from their transmission until the reception after reflection on the object in the monitored area 18 is determined. From the light time of flight, the distance of the object from the laser scanner 10 is calculated based on the vacuum light speed. This evaluation is done in an evaluation unit 30 which is connected to the light transmitter 12, the light receiver 24, the motor 26, and the encoder 28. Therefore, with the angle and the distance, two-dimensional polar coordinates of all objects within the monitored area 18 are available. Preferably, the evaluation unit 30 uses a pulse averaging method for the distance determination which is explained in more detail below with reference to FIGS. 3 and 4. All functional components as described are arrange in a housing which comprises a front screen 34 in the area where light enters and leaves the sensor 10.

In a safety application, the evaluation unit 30 compares the position of detected objects with one or several protection fields whose geometry is set or configured in the evaluation unit 30 by appropriate parameters. The evaluation unit 30 thus detects whether a protection field is violated, i.e. whether there is a forbidden object in a protection field, and switches a safety output 36 (OSSD, Output Signal Switching Device) depending on the result. In that way, for example an emergency shutdown of a connected machine monitored by the laser scanner 10 is triggered. Such a laser scanner is made as a safety laser scanner which means that the standards discussed in the introduction or their equivalents are met and the required safety measures are taken.

The laser scanner 10 can also be used under environmental conditions with reduced view, i.e. it is also usable outdoors or robust against contaminated environments, respectively. To that end, among the possible targets of the laser scanner 10, hard targets and soft targets have to be discriminated.

Figure 2A:
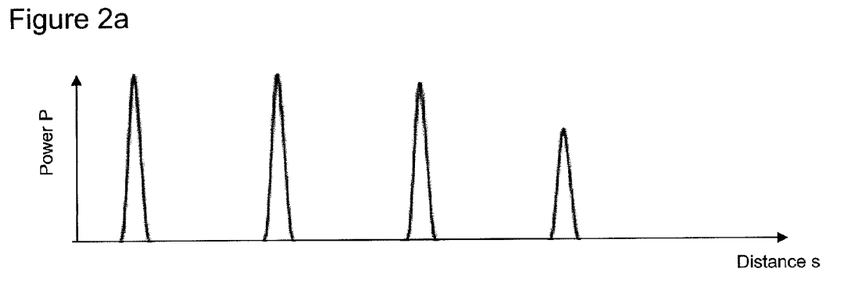
FIG. 2*a* an exemplary, idealized reception signal from hard targets such as snow, rain, or dust particles.

A hard target is an object generating a short signal echo. Examples for hard targets are solid bodies which are considered to be measured objects, but also interfering objects like snow, rain, chips, or coarse dust grains. FIG. 2a shows an idealized reception signal of the laser scanner 10 where small interfering objects cause temporally up stream reception pulses which may lead to a wrong measurement. Depending on the interfering objects and their remission properties, the energy scattered back is different. However, for the measurement object, an identifiable reception pulse remains. For discriminating measured objects from interfering objects within the class of hard targets, parameters like a minimal size or a minimal duration of presence can be used.

Figure 2B:
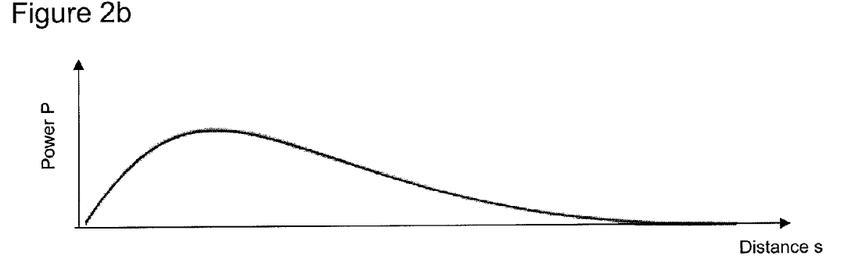
FIG. 2*b* an exemplary, idealized reception signal from soft targets such as rain or soot.

In contrast to hard targets, soft targets cause a broad signal echo which is shown in FIG. 2b in an idealized manner. It is referred to this signal as the fog signal in the following, because soft targets are formed by a large number of small particles, such as fog, fine dust or soot. The numerous particles provide a large number of respective scattering targets.

In a real application with limited view, herein also called opacity, the measurement object is a hard target in an environment constituting a soft target. Correspondingly, one obtains a superposition as the reception signal, as is exemplary shown in FIG. 2c. Considerable interpretation is required to locate the measured object in this reception signal.

Firstly, the pulse shape of the reception pulse of a hard target corresponds to the pulse shape of the transmitted pulse. The pulse shape of the fog signal, in contrast, is a convolution of the pulse shape of the transmission pulse and the signal dynamics. The signal dynamics or distance-dependent intensity characteristics are defined as the distance-dependent detection sensibility for the scanning of a plan, diffusively remitting target. The signal dynamics is essentially a property of the reception optics 22 of the laser scanner 10. Ideally, the signal dynamics is made such that there is practically no signal up to shortly behind the front screen 34, so that reflexes from the front screen 34 cause almost no measurable interference signal. Behind that distance, the signal dynamics should be as constant as possible up to the maximal safe range. After the safe range up to the physical maximum range, the signal dynamics drops quadratically.

Figure 2C:
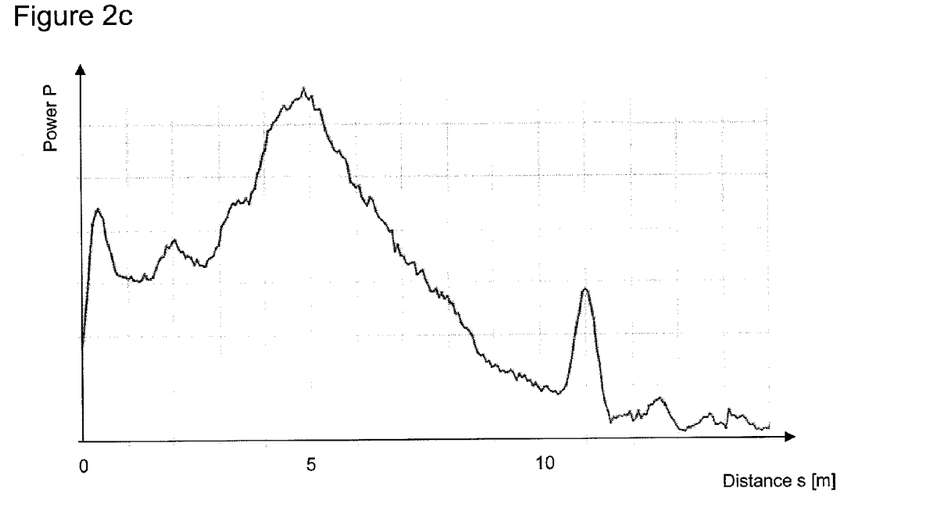
FIG. 2*c* an exemplary reception signal of a hard target in the vicinity of soft targets.

This idealization of the signal dynamics is only approximately achieved in reality. To that end, the reception optics 22 for example comprise a multiple zone lens, so that multiple local maxima corresponding to the multiple zones emerge in the signal dynamics. In the example of FIG. 2c, these local maxima are at about 0.3 m, 2 m, and 5 m. The reception signal shown in FIG. 2c therefore mainly shows the convolution of these signal dynamics determined by the optics design with the transmission pulse shape. The actual measurement signal, in the shown example a reception pulse at about 11 m, is significantly smaller than the fog signal in both width and amplitude. An other signal from a hard target, namely, a snowflake shortly behind the front screen 34, is superposed with the first local maximum of the signal dynamics at 0.3 m.

The measured signal at about 11 m can therefore be identified from its pulse shape and the course of the fog signal which is per se known from the signal dynamics. To this end, it is important that the signal dynamics do not have a fine structure which could be wrongly interpreted as a measured signal. In other words, the spatial frequency spectrum of the signal dynamics must not or at least not significantly overlap with the time spectrum of the transmission pulse shape and consequently the reception pulse shape.

In order to determine the measured signal and its temporal position, the fog signal is to be separated from the remaining signal. This is in principle possible with a single pulse method. However, the method is described in the following based on a pulse averaging method which can manage significantly smaller pulse energies, in particular in contaminated environments, and can nevertheless provide highly accurate measurements. The pulse averaging method as such is known for one-dimensional optical distance sensors from DE 10 2007 013 714 A1, and it is referred to this document for further explanations.

Figure 3:
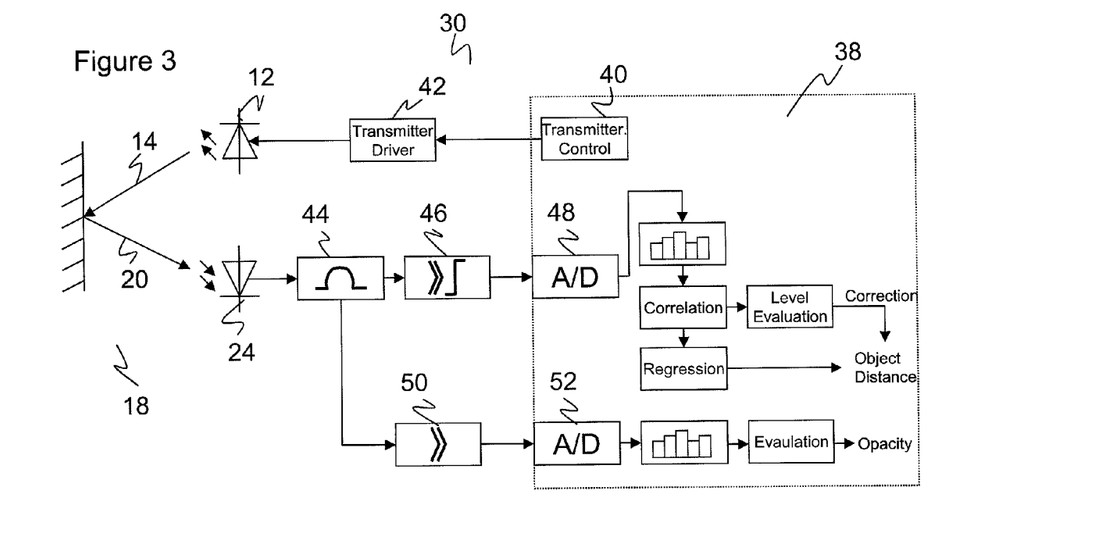
FIG. 3 a block schematic of the transmission and reception paths of the sensor according to FIG. 1.

FIG. 3 shows in a block schematic the transmission and reception path of the laser scanner 10. Apart from the light transmitter 12 and the light receiver 24, the elements shown in FIG. 3 have all been commonly referred to as evaluation unit 30 in FIG. 1.

A large part of the evaluation unit 30 is implemented on a digital component 38, for example an FPGA. On a transmission path, the FPGA 38, which preferably is at the same time the control unit of the laser scanner 10, triggers via a transmission control 40 and a driving circuit 42 the light transmitter 12 to transmit individual light pulses. The transmission control 40 is able to delay transmission pulses on a very fine time grid and to thus transmit them at well-defined points in time.

The remitted light is converted into a reception signal by the light receiver 24. This reception signal at first is divided and pre-processed in analog. A splitter element 44, for example a frequency separating filter or a diplexer, separates the analog reception signal before the ND conversion into two partial reception paths with separate frequency ranges. The filter frequency is for example 100 Mhz. Other filter frequencies in a different range, for example a range of up to 250 MHz, are also possible.

The higher frequency portion comprises the reception pulses from hard targets and is passed on a first analog partial reception path via a pre-amplifier and a limiting amplifier 46 to a first ND converter 48. The fog signal is almost completely eliminated in the first partial reception path due to the filtering properties of the splitter element 44 and the relatively broad signal shape of the fog signal.

The lower frequency portion, on the other hand, comprises the fog signal from soft targets and is passed on a second analog partial reception path via an amplifier 50 and a second ND converter 52. Because of the comparably slow changes of the fog signal, the sampling frequency of the second ND converter 52 can be selected slower than the sampling frequency of the first ND converter 48 to keep the hardware costs of the FPGA 38 low.

The evaluation of the two partial reception signals in the FPGA 38 is done after a respective accumulation of a histogram over a plurality of events, i.e. sections of time following a transmission pulse. In the first partial reception path, the temporal position of the reception pulse is determined.

Figure 4:
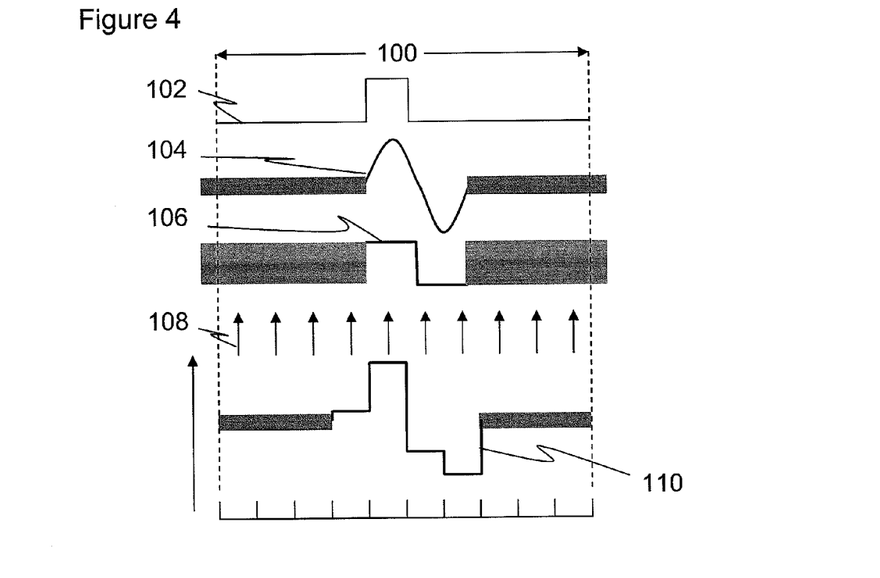
FIG. 4 a representation of the signals in different stages of processing of the preprocessing and evaluation according to FIG. 3.

FIG. 4 shows a schematic representation of the signals in different stages of the pre-processing and evaluation of the first partial evaluation path. In each measurement period 100, the light transmitter 12 generates a respective transmission pulse which enables the determination of a precise point in time. A rectangular pulse can be used, but other pulses are also conceivable, for example Gaussian pulses. The individual light pulse is reflected or remitted in the monitored area 18 and afterwards converted into an electrical reception pulse 102 in the light receiver 24. The reception pulse 102 is represented in an idealized manner, under realistic conditions, noise portions would superimpose and shape distortions occur.

The reception pulse 102 is always a unipolar signal due to the nature of light. The splitter element 44 is at the same time configured as a filter, for example a band pass filter. The filter properties on the one hand effect the frequency dependent separation into the two partial reception paths. In a dual function, the splitter element 44 also generates a bipolar signal 104 from the unipolar reflection pulse 102 due to its filter proper ties, where only the first two oscillations of the bipolar signal 104 are shown. At the sides of the actual bipolar signal 104, gray rectangles symbolize a noise level. In the limiting amplifier 46, the bipolar signal 104 is amplified into saturation and cut off, so that the actual signal becomes a rectangular signal 106, and the noise level represented by gray rectangles is extended in its amplitude over the entire dynamic range.

The rectangular signal 106 is sampled in the first A/D converter which is in particular made as a binarizer. Each sampling point of the sampling is symbolized by an arrow 108. The resulting bit sequence is used in the FPGA 38 to form a histogram 110. For each bin, an accumulator is provided which is only increased at a corresponding bit value "1". For ideal signals without noise, only that bin would be filled where the rectangular signal 106 is located. However, the noise level increased by the limiting amplifier 46 also fills the other bins with an expectation value of about each second measurement period 100 due to the random nature of the noise.

In case the method as described above is iterated, and the histogram 110 is accumulated over n measurement periods 100, the bins are approximately filled with the value n/2 by the noise, where statistical fluctuations are added. This value of n/2 corresponds to a signal value of zero due to the binarization. From that, the maximum formed by the positive part of the bipolar signal 104 exceeds upwards, and the corresponding minimum forms downwards. The zero crossing in between is subsequently detected by the FPGA 38. To that end, for example, the histogram is correlated with an expected course of the bipolar signal. This either directly or with an optional additional regression results in a reception point in time whose difference to the known transmission point in time determines the light time of flight. The reception point in time can additionally be corrected by level information that is obtained as a sum over the histogram.

By statistical evaluation of a plurality of individual measurements, the signal-to-noise ratio is increased to an extent that even under interfering environmental conditions robust distance measurements are possible. This holds even if a single amplified reception pulse is so noisy that no difference between useful signal and noise can be discerned.

FIG. 4 shows only a relevant section of the measurement period 100 in the vicinity of the reception point in time. In order to save memory, this time region can be set in advance or be located, and the histogram 110 can only be formed for a part of the measurement period 100.

Caused by the rotational movement of the deflection unit 16, each transmission pulse has an individual angle offset. The pulse averaging method supports a trade-off relation between scanning frequency, angular resolution, range, and repetition frequency of the transmission pulses. These are interrelated by the statistical depth or the averaging depth, i.e. the number of reception pulses 102 which are respectively accumulated for a measurement value. For example, it is thus possible to obtain a higher angular resolution at the expense of the range or vice versa.

Figure 5A:
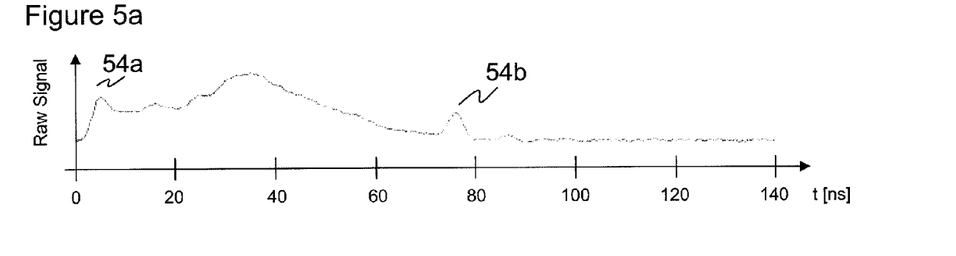
FIG. 5*a* an exemplary reception signal of the sensor according to FIG. 1.
Figure 5B:
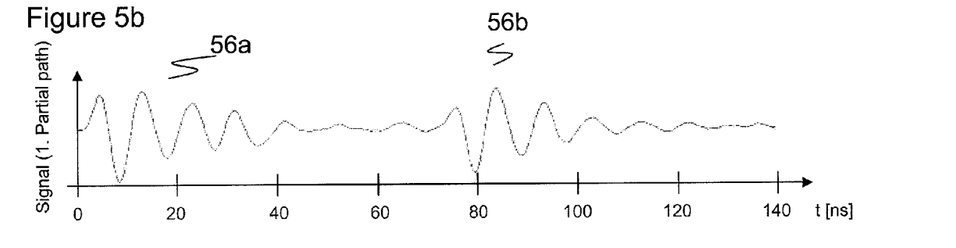
FIG. 5*b* an exemplary first partial reception signal in a first partial reception path according to FIG. 3.
Figure 5C:
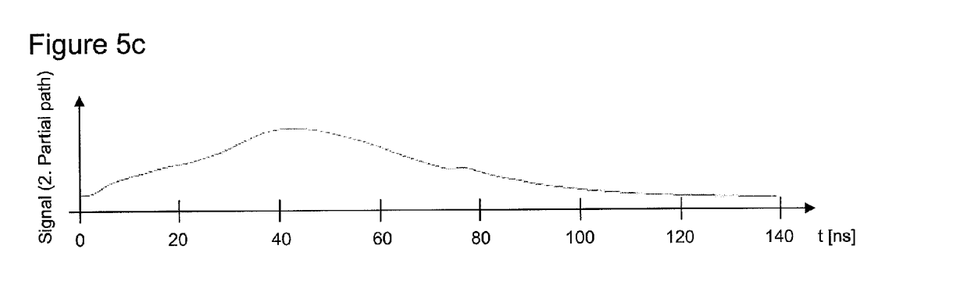
FIG. 5*c* an exemplary second partial reception signal in a second partial reception path according to FIG. 3.

FIG. 5 shows reception signals in the different reception paths. These reception signals are almost noiseless and thus idealized. However, after a sufficient number of events, a very similar signal course would show after accumulating the histogram.

FIG. 5*a* is a raw signal directly after the light receiver 24. It still contains all frequency portions and corresponds to the signal of FIG. 2*c*. The reception pulses 54*a-b* of two hard targets are superimposed with the fog signal. The first reception pulse 54*a* is that of an interfering object, such as a snowflake, and the second reception pulse 54*b* is the actual measured signal.

FIG. 5*b* shows the first partial reception signal with the higher frequency portions after the splitter element 44. Firstly, the fog signal is almost eliminated due to the filter properties of the splitter element 44. Moreover, the two unipolar reception pulses of the overall signal shown in FIG. 5*a* are converted into two bipolar signals 56*a-b* with a number of higher order oscillations which can be easily evaluated. In both bipolar signals 56*a-b*, the first zero crossing or a subsequent zero crossing can be used to determine the temporal position of the reception pulse with high accuracy.

FIG. 5*c* shows the second partial reception signal with the lower frequency portions. Here, a 10 MHz second reception path is used as an example. The fog signal, which is expected to be the convolution of the pulse shape of a transmission pulse with the signal dynamics, can clearly be seen and evaluated.

From the fog signal, an example of which is shown in FIG. 5c, the FPGA 38 can gather useful knowledge. Firstly, the area below the fog signal can be integrated. This can easily be done in a histogram by summing over the bins. A level measurement results which can be used to evaluate whether there is any opacity or limited vision at all. The level measurement also is a measure for the energy reflected due to the opacity, and therefore for the reduction in visual range caused by the opacity. From the quantitative evaluation of the opacity, further measures can be deducted, for example a test whether a safe use is still possible in spite of the reduced visual range, a speed reduction of vehicles, an additional safety margin for protection fields, and the like.

The fog signal does not only include the integrated level information, but can also be evaluated with a positional resolution by evaluating individual bins or groups of bins of the histogram. The opacity can thus be classified in dependence on the distance. As long as the computational power is available, additional, more complex pattern evaluation methods can be applied to explore the fog signal in even more detail.

Depending on the degree of the opacity, for example the density of the fog, averaging over a small angular range may not be sufficient to generate a fog signal strong enough for the evaluation. This is because, while for the actual object detection in the first partial reception path there are relatively high energy densities due to the transmission pulses, this energy is diffusely spread in the fog signal. Therefore, it is conceivable to select a different statistical depth in the first partial reception path and in the second partial reception path. For the measurement of object distances with the first partial reception signal, events are accumulated in a relatively small angular range in this embodiment, for example 0.5° or 1°, with an accordingly high angular resolution for the object position. For capturing the fog signal, on the other hand, a histogram with a larger number of events from a larger angular range of for example at least 10° is formed. This is based on the assumption, which generally holds, that the opacity does not change within small angular steps.

Since the fog signal is often weak, it may be difficult to discern from other sources of interference and from noise. Therefore, it will be an advantage if the fog signal has characteristic properties which could be used both to identify and separate the fog signal onto the second partial reception path. Now, as already explained on several occasions, the fog signal is the convolution of the transmission pulse shape and the signal dynamics. Hence, by intentional modification of the signal dynamics, the desired characteristic properties can be added to the fog signal.

Figure 6:
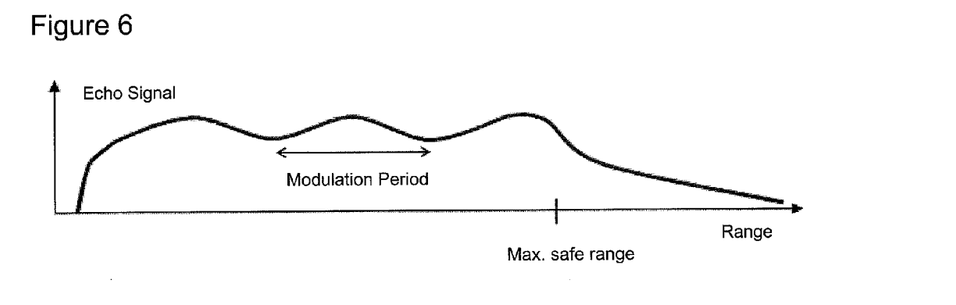
FIG. 6 an exemplary course of the reception signal at a modulation of the signal dynamics for identifying an opacity.

FIG. 6 shows corresponding exemplary signal dynamics. The distance-dependent signal dynamics is spatially modulated so that the fog signal can already be separated and identified from the one or several frequency ranges of the modulation. The modulation frequency should be outside the frequency portions of the reception pulses. In the example of FIG. 6, which is comparable in scale with the FIGS. 2 to 5, the modulation was added with small amplitude and a spatial frequency of 2 m. Such a modulation hardly affects the pulse shape of the reception pulses from a hard target, because the signal dynamics are virtually constant on the time scale of the short reception pulses. Therefore, the reception pulse is merely scaled a little, depending on the distance where the hard target is positioned.

Preferably, the modulation period is at most half as long as the roundtrip time for the maximal safe range. Safe range is the range up to which the laser scanner 10 generates reliable or, in safety applications, safe measurement values. Therefore, the safe range is always smaller than the actual, physical range.

The approach of a modulation of the signal dynamics is based on the fact that the fog signal is a superposition from a high number of diffuse scattering targets at different distances. Hence, the fog signal is modulated like the signal dynamics and can be identified from characteristics of the signal dynamics alone, like the modulation frequency. In another embodiment differing from FIG. 3, this does not even require an A/D conversion and the forming of a histogram in the second partial reception path. With modulated signal dynamics, the degree of opacity or reduction in visual range can be directly determined from the amplitude of the detected modulation oscillation of the fog signal in the second partial reception path.

The invention claimed is:

1. An optoelectronic sensor (10) for the detection and distance determination of objects in a monitored area (18), the sensor (10) having a light transmitter (12) for transmitting a transmission light beam (14), a light receiver (24) for generating a reception signal from transmission light (20) remitted or reflected from objects in the monitored area (18), and an evaluation unit (30) configured to determine distance of an object from the sensor based on light time of flight between transmission of the transmission beam (14) and reception of remitted transmission light (20), wherein a reception path between the light receiver (24) and the evaluation unit (30) is divided into a first partial reception path (46, 48) and a second partial reception path (50, 52) at a splitter element (44), which comprises filtering properties to pass higher frequency parts of the reception signal as a first partial reception signal on to the first partial reception path (46, 48) and lower frequency parts of the reception signal as a second partial reception signal on to the second partial reception path (50, 52), and wherein the evaluation unit (30) is configured to determine whether objects are present in the monitored area (18), to determine the distance of the object from the first partial reception signal, and to determine an opacity from the second partial reception signal.

2. The sensor (10) according to claim 1, wherein the transmission light beam (14) comprises a plurality of successive individual light pulses, and wherein the evaluation unit (30) is configured to accumulate a plurality of reception pulses (102) for the first partial reception signal in a time histogram (110) and to determine the distance of the object from the histogram (110).

3. The sensor (10) according to claim 1, wherein the transmission light beam (14) comprises a plurality of successive individual light pulses, and wherein the evaluation unit (30) is configured to accumulate a plurality of sections for the second partial reception signal following a transmitted individual light pulse in a time histogram and determine a measurement for the opacity from the histogram.

4. The sensor (10) according to claim 1, wherein the sensor (10) is a laser scanner comprising a movable deflection unit (16) for periodically deflecting the transmission light beam (14) in the monitored area (18) and an angle encoder (28) for generating angle position signals depending on an angular position of the deflection unit (16).

5. The sensor (10) according to claim 4, wherein the evaluation unit (30) is configured to select a respective group of reception pulses (102) in a histogram (110) based on the angular position and to assign the distance of the object determined from the histogram (110) to a detection angle given by the angle position signals.

6. The sensor (10) according to claim 4, wherein the evaluation unit (30) is configured to form groups of high angular resolution for the first partial reception path (46, 48) and groups of a lesser angular resolution for the second partial reception path (50, 52).

7. The sensor (10) according to claim 6, wherein the high angular resolution is at most 2° and the lesser angular resolution is at least 3°.

8. The sensor (10) according to claim 1, wherein an analog preprocessor (44, 46) is provided in the first partial reception path (46, 48) comprising a filter element (44) to convert a respective reception pulse (102) into a bipolar preprocessed signal (104) and pass it on to the evaluation unit (30, 38) via an A/D converter (48).

9. The sensor (10) according to claim 8, wherein the analog preprocessor (44, 46) comprises a limiting amplifier (46) for amplifying the positive and negative parts of the signal (104) to a saturation value, and wherein the A/D converter (48) is a binarizer.

10. The sensor (10) according to claim 8, wherein the splitter element (44) is also the filter element (44).

11. The sensor (10) according to claim 1, wherein a first A/D converter (48) is provided in the first partial reception path (46, 48) and a second A/D converter (52) is provided in the second partial reception path (50, 52).

12. The sensor (10) according to claim 11, wherein a sampling frequency of the second A/D converter (52) is lower than a sampling frequency of the first A/D converter (48).

13. The sensor (10) according to claim 1, wherein the evaluation unit (30, 38) is configured to integrate the second partial reception signal in a time histogram to determine a measurement for the opacity from level information obtained by the integration.

14. The sensor (10) according to claim 13, wherein the evaluation unit (30, 38) is configured to obtain the level information as a sum over the histogram.

15. The sensor (10) according to claim 1, wherein reception optics (34, 16, 22) arranged in front of the light receiver (24) are configured so the reception signal comprises intensity characteristics dependent on the distance of the object, and wherein the intensity characteristics are periodically modulated with a period that is large as compared to the duration of a transmission pulse and which corresponds to half of the range of the sensor (10) or less.

16. The sensor (10) according to claim 1, wherein the evaluation unit (30) is configured to detect the opacity based on a modulation of the second partial reception signal.

17. The sensor (10) according to claim 1, wherein the sensor (10) is a safety laser scanner comprising a safe output (36) and the evaluation unit (30) is configured to output a shutdown signal via the safe output (36) upon detection of a forbidden intrusion into a predefined protection area within the monitored area (18).

18. A method for the detection and distance determination of objects in a monitored area (18), comprising the steps:
    detecting and converting remitted or reflected parts (20) of a transmission light beam (14) into a reception signal,
    determining a distance of an object from light time of flight between transmission of the transmission light beam (14) and reception of remitted transmission light (20),
    wherein the reception signal is divided into a first partial reception signal on a first partial reception path (46, 48) and a second partial reception signal on a second partial reception path (50, 52) at a splitter element (44) based on frequency properties, and
    wherein whether objects are present in the monitored area (18) and the distance of an object are determined from the first partial reception signal and an opacity is determined from the second partial reception signal.

19. The method according to claim 18, wherein the transmission light beam (14) comprises a plurality of successive individual light pulses, and wherein a plurality of reception pulses of the first partial reception signal are accumulated in a time histogram (110) and the distance of the object is determined from the histogram (110).

20. The method according to claim 18, wherein a plurality of sections of the second partial reception signal following a respective transmitted individual light pulse are gathered in a time histogram and a measurement for the opacity is determined from the histogram.

21. The method according to claim 20, wherein the measurement for the opacity is determined from level information obtained from a sum over the histogram.

22. The method according to claim 18, wherein the monitored area (18) is scanned such that the transmission light beam (14) is periodically deflected in the monitored area (18) by a movable deflection unit (16), wherein an angle position signal is generated depending on an angular position of the deflection unit (16) and a group of reception pulses is selected based on the angular position and gathered in one histogram (110), and wherein the distance of the object determined from the histogram (110) is assigned to a detection angle given by the angle position signal.

23. The method according to claim 18, wherein reception optics (34, 16, 22) shape intensity characteristics of the reception signal, depending on the distance of the object, with a periodic modulation having a period which is large as compared to the duration of a transmission pulse and which corresponds to half of a maximal range of detection or less, and wherein the opacity is detected based on a modulation of the second partial reception signal.

* * * * *